United States Patent Office 3,794,644
Patented Feb. 26, 1974

3,794,644
PYRROLO-BENZODIAZEPINONE COMPOUNDS
Kazuo Kariyone, Kyoto, and Hisatoyo Yazawa, Toyonaka, Japan, assignors to Fujisawa Pharmaceutical Co, Ltd., Osaka, Japan
No Drawing. Filed June 25, 1970, Ser. No. 49,974
Claims priority, application Japan, June 26, 1969, 49/50,780
Int. Cl. C07d 53/06
U.S. Cl. 260—239.3 T                3 Claims

ABSTRACT OF THE DISCLOSURE

The pyrrolo-benzodiazepinone compounds of the formula:

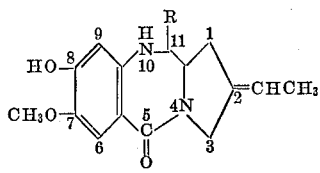

exhibit activity against a number of micro-organisms including bacteria, fungi and bacteriophage and also have antiviral or antitumor activities, and therefore are useful as therapeutic agents in the treatment of diseases caused by certain pathogenic microorganisms.

---

The present invention relates to novel and useful pyrrolo-benzodiazepinone compounds and more particularly to 11 - substituted-5H-pyrrolo[2,1-c][1,4]benzodiazepin-5-one compounds and to a process for preparing the same.

It has been found that the compounds of the present invention commonly and characteristically possess antibiotic properties, exhibiting activity against certain microorganisms and bacteriophages. The compounds also evidence antiviral or antitumor activity, and therefore may be useful as therapeutic agents in treatment of diseases caused by certain pathogenic microorganisms or viruses.

Accordingly, it is one object of the present invention to provide novel 11-substituted-5H-pyrrolo[2,1-c][1,4]benzodiazepin-5-one compounds possessing antibiotic properties.

Another object of the present invention is to provide a process for the preparation of such compounds.

Other objects and advantageous features of the present invention will become apparent from the following description.

The compounds which are included in the scope of the present invention are represented by the formula:

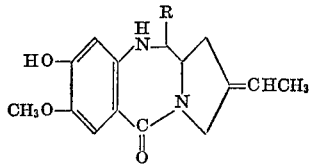

wherein R is lower alkylthio, aryl(lower) alkylthio or di(lower)alkylamino.

The alkyl portion of the foregoing substituents may preferably be a monovalent straight-chain or branched aliphatic hydrocarbon radical having one to four carbon atoms. Preferred examples of such portions are methyl, ethyl, propyl, isopropyl, butyl, isobutyl, tert.butyl and the like.

The aryl portion of the aryl(lower)alkylthio substituent may be an aromatic hydrocarbon radical. Preferred examples of such aryl substituent are phenyl, tolyl, naphthyl and the like.

The compounds of the present invention are prepared by reacting a compound of the formula:

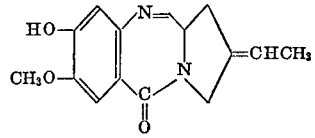

with a compound of the formula:

R—H [III]

wherein R is the same meaning as defined above.

Compound II can be prepared, for instance, by cultivating *Streptomyces achromogenes* var. *tomaymyceticus* (deposited with American Type Culture Collection under the Number ATCC 21353) in a nutrient medium by conventional methods well known to the art to produce an antibiotic, treating the produced antibiotic (whether isolated or not) with methanol to yield the compound represented by the formula:

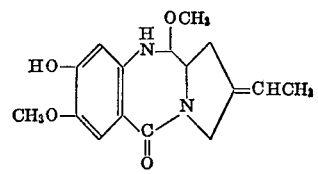

and treating the Compound IV with a solvent such as chloroform or ethyl acetate followed by addition of n-hexane to eliminate the 11-methoxy substituent of said compound.

Compound III is a thiol of the formula R—H in which R is a lower alkylthio or aryl(lower)alkylthio radical. It may also be a dialkylamine in which R is di(lower)alkylamino. Preferred examples of the thioalcohol are methanethiol, ethanethiol, propanethiol, isopropanethiol, phenylmethanethiol, phenylethanethiol and the like. Preferred examples of the dialkylamine are dimethylamine, diethylamine, methylethylamine, dipropylamine, methylpropylamine and the like. However, other thioalcohol and dialkylamines not specifically mentioned herein can also be used.

Reaction of a starting compound [II] with a reactant [III] is usually and preferably carried out in an inert solvent such as methylene dichloride, chloroform, ethyl acetate, carbon tetrachloride or mixtures thereof. However, when reactant [III] is a liquid, the reaction may be carried out simply by dissolving the starting compound [III] in said reactant.

The reaction temperature may vary widely but is preferably between 25° C. and 35° C. The reaction can also be carried out outside this range provide that undesirable side reactions do not occur. The resulting reaction product can be separated and purified by conventional methods to provide the compound of the present invention.

As stated above, the desired compounds of the present invention are antibiotics. For instance, they exhibit antimicrobial activity against grampositive bacteria, e.g. *Staphylococcus aureus*, *Bacillus subtilis*, *Corynebacterium xerosis*, *Sarcina lutea*, etc.; and fungi, e.g. *Aspergillius niger*, *Penicillium chysogenum*, *Saccharomyces cerevisiae*, etc.; yeasts, e.g. *Tolula utilis*, *Candida albicans*, etc.; and bacteriophages, e.g. *Escherichia coli* phage *Bacillus subtilis* phage, etc. The compounds also have a virucidal activity, e.g. against DNA virus Herpes simplex hominis in vitro. A further antibiotic property noted in some of the compounds is their ability to inhibit the growth and development of certain transplantable and induced tumors, e.g. leukemia, Ehrich's *Carcinoma ascites* in animals, etc. Accordingly, the desired compounds of the present invention may be useful as therapeutic agents in treatment of diseases caused by certain pathogenic microorganisms.

The following is a description evidencing antibiotic utilities of the desired compound of the present invention.

BACTERIOPHAGE TEST 1 ml. of a suspension containing $2\times10^4$ particles of the test phage (*Bacillus subtilis* SP10 phage) per ml. 0.01 M-Tris-HCl buffer (pH 7.2) was added to each dilution (1 ml.) of sample of the compound to be tested in the above buffer. The mixture (0.1 ml.) was incubated for one hour at 37° C. and poured into a Petri dish containing 1.5% nutrient agar. A phage count was made by the drop-method with the host strain, the amount inactivating just 50% of the phage being expressed in mcg./ml. The test compound was Formula I wherein R was varied. The result is shown in the following table.

TABLE

| R: | Concentration inactivating 50% phage activity, mcg. |
|---|---|
| Benzylthio | 0.3 |
| Ethylthio | 2.5 |

TEST ON LEUKEMIA

The compound of the Formula I wherein R is benzylthio shows activity in experimental tumor as could be demonstrated by its significant inhibition of leukemia strain L1210–S: 14.3% prolongation of survival time with the well tolerated dose 0.125 mg./kg., i.p., four applications on four consecutive days.

In this test, female mice weighting 18–22 g. were transplanted with a distinct amount of cells or cell material into Hank's solution, the dose of which causing 100 percent takes. Randomized groups of ten animals per dose were treated for the first time four hours after transplantation with the dose of the test compound of the Formula I wherein R is benzylthio, followed by daily application of the same dose on the three following days. Solutions of the test compound were prepared in triethyleneglycol with 90 percent distilled water. A single dose was given in 0.5 ml. per 20 g. mouse and finally calculated per kg.

The compounds of the present invention may be used as medicaments in the form of pharmaceutical preparations which comprise the compound of the present invention as an active ingredients and pharmaceutically acceptable carrier suitable for oral or parenteral administration. Solid pharmaceutical preparations may be, for example, in the form of capsules, tables, dragees or the like and liquid preparations may be, for example, in the form of solutions, suspensions, emulsions, etc. If desired, these preparations can also contain adjuvants such as preserving agents, stabilizing agents, emulsifying agents, salts for varying the osmotic pressure and buffers. While the dosage of the compound will vary from compound to compound and also depend upon the age and condition of each individual patient being treated, a daily dose of about 20 mcg./kg. of the compound is generally appropriate for treating disease against which the compound is active.

The starting material is prepared as generally described herein. A more detailed process for preparation of said starting material is set forth below.

A 500 ml. flask containing 100 ml. of the following medium was provided.

| Ingredients: | Percent by weight |
|---|---|
| Lactose | 3 |
| Meat extract | 1 |
| Yeast extract | 1 |
| Polypeptone | 1 |
| Polypeptone | 1 |
| Sodium chloride | 0.25 |

This medium was sterilized and the vegetative growth and spores of *Streptomyces achromogenes* var. *tomay-*

*myceticus* (ATCC 21353 grown on agar slants, was transferred thereto. It was shaken for 3 days at 30° C. to form the inoculant culture.

In a 2-ton stainless tank were placed 1000 liters of a fermentation broth having the following composition.

| Ingredients: | Percent by weight |
|---|---|
| Lactose | 3 |
| Meat extract | 1 |
| Yeast extract | 1 |
| Polypeptone | 1 |
| Sodium chloride | 0.25 |
| Potassium dihydrogen phosphate | 1.5 |
| Sodium hydrogen phosphate (12 H$_2$O) | 0.43 |

The pH of the medium was adjusted to 6.1. The culture broth was sterilized by heating it under pressure at about 120° C. for about 30 minutes. The broth was cooled and about 1 ml. of the above inoculant culture was added aseptically. The organism was grown in the broth for 50 to 60 hours at a temperature of 30° C. During the growth period, the broth was stirred and sterile air was blown through the broth at a rate of about 1000 liters of sterile air per minute on a propeller shaker operating at 350 r.p.m.

After the fermentation was completed, the mycelium was removed by centrifugation. The supernatant was treated with about 5 kg. activated carbon, while stirring for 30 minutes. After the mixture had been filtered, the activated carbon was extracted with 100 liters of a mixture of pyridine, ammonia, ethanol and water in a ratio of 10:3:80:10 by warming it at 45° C. for 30 minutes, followed by re-extraction of the activated carbon. The extract was concentrated under reduced pressure at 50° C. and lyophilized to give 1.6 kg. of powder. The powder was washed with about 10 liters of n-hexane dissolved in water and the solution obtained was adjusted to pH 2 to 3. The acidified solution was extracted with four 5-liter portions of chloroform. The chloroform extract was washed with 5% aqueous solution of sodium bicarbonate, dried over anhydrous sodium sulphate and concentrated under reduced pressure at 50° C. to give an oily residue which was treated with petroleum ether. Filtration of the petroleum ether solution gave about 20 g. of powder which was dissolved in 100 ml. ethyl acetate and adsorbed on silicic acid in a column and eluted with about 8 liters ethyl acetate. The eluate was concentrated almost to dryness, followed by the addition of about 30 ml. methanol. A precipitate was formed in the methanolic solution by keeping it at −20° C. for 2 days. This was filtered off to give about 1.8 g. of crude crystalline material which was then dissolved in about 30 ml. warm methanol. The methanolic solution was allowed to stand for 2 days at −20° C. to give 1.2 g. pure crystalline 1,2,3,10,11,11a-hexahydro-2-ethylidene-7,11-dimethoxy - 8 - hydroxy - 5H-pyrrolo[2,1-c][1,4] benzodiazepin-5-one, melting at 145–146° C. (decomposed).

*Analysis.*—Calculated for $C_{16}H_{20}N_2O_4$ (percent): C, 63.16; H, 6.58; O, 12.05; N, 9.21. Found (percent): C, 62.95; H, 6.66; O, 21.25; N, 9.05.

The ultravoilet absorption spectrum of this compound in methanol shows maximum peaks at 224 m$\mu$ ($\epsilon$=36,000) and 320 m$\mu$ ($\epsilon$=3,600), and shoulders at 236 m$\mu$ ($\epsilon$=30,000) and 260 m$\mu$ ($\epsilon$=9,000).

The infra-red absorption spectrum in a Nujol null shows bands at 3340, 1640, 1570, 1510, 1425, 1290, 1265, 1210, 1190, 1180, 1070, 830, 800 and 765 cm.$^{-1}$.

A solution of 1 g. of the resulting 1,2,3,11a-hexahydro-2-ethylidene - 7,11 - dimethoxy-8-hydroxy-5H-pyrrolo[2,1-c][1,4]benzodiazepin-5-one (Formula IV) in an excess of chloroform or ethyl acetate was concentrated to smaller volume and n-hexane was added thereto to form a precipitate. The precipitate was filtered and washed with ether, while cooling, to give 700 mg. 1,2,3, 11a-tetrahydro-2-ethylidene - 7 - methoxy-8-hydroxy-5H- pyrrolo[2,1-c][1,4]benzodiazepin-5-one (Formula II) in the form of a pale yellow powder melting at 108 to 112° C. (decomposed).

*Analysis.*—Calculated for $C_{15}H_{16}N_2O_3$ (percent): C, 66.16; H, 5.92; O, 17.63; N, 10.29. Found (percent): C, 66.04; H, 6.02; O, 17.55; N, 10.41.

The following examples are given for the purpose of illustrating the present invention:

Eample 1

To a solution of 0.54 g. of the compound of Formula II in 5 ml. methylene chloride was added 0.26 g. of phenylmethanethiol. After stirring for 5 hours, the reaction mixture was allowed to stand for 4 days at ambient temperature. After distilling off the methylene chloride under reduced pressure at a temperature of less than 50° C., a yellow powder was obtained which was purified by silica gel thin layer chromatography to give 0.14 g. 1,2,3,10,11,11a-hexahydro-2-ethylidene-7-methoxy-8-hydroxy - 11 - benzylthio-5H-pyrrolo[2,1-c][1,4]benzodiazepin-5-one. This was recrystallized from benzene to give a pure crystalline material, melting at 143–145° C. (decomposed).

*Analysis.*—Calculated for $C_{22}H_{24}N_2O_3S$ (percent): C, 66.72; H, 6.11; N, 7.07. Found (percent): C, 66.70; H, 6.00; N, 6.52.

Example 2

To a solution of 0.27 g. of the compound of Formula II in 5 ml. methylene chloride was added 1.5 ml. ethanethiol. The solution was allowed to stand for 6 days and then concentrated under reduced pressure to give a residue which was dissolved in water. Methylene chloride was added to form a methylene chloride layer, which was separated, washed with water and dried over anhydrous magnesium sulphate. After distilling off the solvent, there were obtained 0.2 g. yellow crystals of 1,2,3,10,11,11a-hexahydro-2-ethylidene-7-methoxy - 8 - hydroxy-11-ethylthio-5H-pyrrolo[2,1-c][1,4]benzodiazepin-5-one, melting at 70–74° C. (decomposed).

*Analysis.*—Calculated for $C_{17}H_{22}N_2O_3S$ (percent): N, 8.65. Found (percent): N, 8.15.

Example 3

To a solution of 0.54 g. of the compound of Formula II in 5 ml. methylene chloride was added a solution of 1,2 g. dimethylamine. After stirring for 5 hours, the reaction mixture was left to stand for 4 days. The methylene chloride layer was separated, washed with water and dried over anhydrous magnesium sulphate. After a solvent had been removed under reduced pressure, 3 g. of a pale yellowish-brown powder was obtained. This was 1,2,3,10,11,11a-hexahydro - 2 - ethylidene-7-methoxy-8-hydroxy-11-dimethylamino-5H - pyrrolo[2,1-c][1,4]benzodiazepin-5-one. It was purified by silica gel thin layer chromatography to give a pure, yellowish-brown crystalline material melting at 65–68° C. (decomposed).

What we claim is:

1. A compound of the formula:

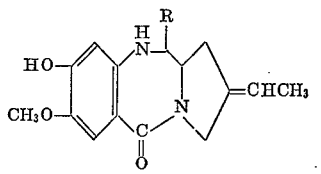

wherein R is dialkylamino, said alkyd being a group having 1–4 carbon atoms.

2. The compound according to claim 1, wherein R is dimethylamino.

3. A process for preparing a compound of the formula:

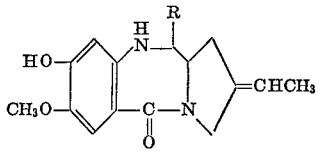

wherein R is dimethylamino, which comprises reacting a compound of the formula:

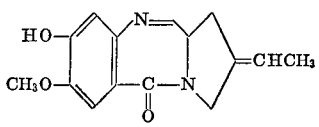

with dimethylamine.

References Cited

UNITED STATES PATENTS

| | | |
|---|---|---|
| 3,692,777 | 9/1972 | Arima et al. ____ 260—239.3 T |
| 3,523,941 | 8/1970 | Leimgruber et al. 260—239.3 T |
| 3,524,849 | 8/1970 | Batcho et al. ____ 260—239.3 T |

OTHER REFERENCES

Burger: "Medicinal Chemistry," 2nd ed., pp. 92–81 (Interscience) (1960).

Burger: "Medicinal Chemistry," 3rd ed., vol. 1, pp. 64–80 (Wiley-Interscience) (1970).

HENRY R. JILES, Primary Examiner

R. T. BOND, Assistant Examiner

U.S. Cl. X.R.

195—80; 424—274